T. G. COLLAS.
COLLAPSIBLE CRATE.
APPLICATION FILED NOV. 30, 1907.
937,422.
Patented Oct. 19, 1909.
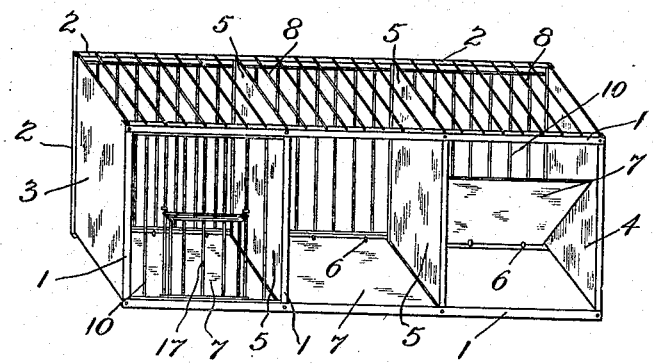
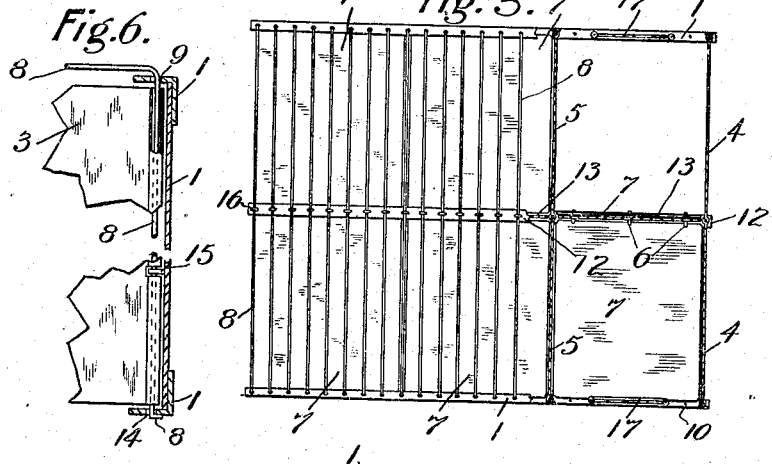
WITNESSES
INVENTOR
Thomas Gillichan Collas

UNITED STATES PATENT OFFICE.

THOMAS GILLICHAN COLLAS, OF SEYMOUR, VICTORIA, AUSTRALIA.

COLLAPSIBLE CRATE.

937,422.  Specification of Letters Patent.  Patented Oct. 19, 1909.

Application filed November 30, 1907. Serial No. 404,481.

*To all whom it may concern:*

Be it known that I, THOMAS GILLICHAN COLLAS, a subject of the King of Great Britain, residing at Station street, Seymour, in the State of Victoria, Australia, have invented certain new and useful Improvements in Collapsible Crates; and I do declare the following to be a full, clear, and exact description of the invention, such as will enable others skilled in the art to which it appertains to make and use the same.

My invention has been devised to provide a crate, which when collapsed will occupy very little space, and when opened or extended may be used as a carrying crate for live poultry, pigeons or the like, as a show coop or crate for exhibiting poultry or other birds, or as a packing crate for rabbits and other produce. When made in a large size it may be used in connection with a poultry house or yard.

I would have it understood that wherever I use the word "crate" herein I mean it to include carrying crate, show coop, pen and such like constructions.

In order that my invention may be the more easily understood reference may be made to the accompanying drawings, in which—

Figure 1 is a general view of the crate in an extended condition, part of the front grillework being removed for the sake of clearness. Fig. 2 is a plan of the crate in a closed position with some of the top bars removed. Fig. 3 is a plan partly in section of a modified form in which the crate is double in breadth. Fig. 4 is a plan of the crate illustrated in Fig. 3, in a partly collapsed condition, while—Figs. 5 and 6 are views of details.

I provide two main frames 1 and 2 (see Fig. 1) which will form the front and rear respectively of the crate. These frames are of an oblong shape and constructed preferably of light iron. The ends of the crate are formed of two sheets of metal 3 and 4, which are hinged to the front and rear frames 1 and 2 in a manner as will be hereinafter shown. When the crate is in an extended condition the ends 3 and 4 will be at right angles to the frames 1 and 2.

The length of the crate may be divided into sections by plates or sheets of metal 5 placed parallel to the ends 3 and 4 and hinged to the frames in the same manner. In Fig. 1 the crate is shown divided into three sections. The hinging of the ends 3 and 4 and the dividing plates or sheets 5 (where such are used) allows the crate to be collapsed to the position shown in Fig. 2 in which case the front and back frames 1 and 2 come together and the ends and dividing plates lie almost parallel to them.

I provide a bottom plate, or plates, 7 the number corresponding with the number of divisions of the crate. The bottom plates are attached by the hinges 6 to the bottom member of either the frame 1 or the frame 2. As shown in Fig. 1 the bottom plates are hinged to the lower member of the frame 2. The plates 7 lie parallel to and close against the back frame 2 when the crate is collapsed but when same is opened or extended will fall down to a position at right angles to the frames 1 and 2 between the division plates 5 or between a division plate and end plate or between the end plates 3 and 4 as the case may be thus forming the bottom of the crate. While in this position the bottom plates 7 prevent the crate from collapsing. The fronts of the plates 7 rest on the lower member of the front frame 1.

The top of the plate is covered by a number of bars 8 the ends of which are hinged or swiveled to the top members of the front and back frames. This hinging or swiveling is preferably obtained by passing the ends of the bars 8 through perforations 9 in the top members of the frames 1 and 2 then bending the ends to about the position shown in Fig. 5. The bars 8 lie at right angles to the frames 1 and 2 when the crate is in the open or extended condition.

The front and back frames 1 and 2 will be covered with grille-work 10, and the front frame will be provided with a door 17 leading to each division.

I may in some cases construct the crate in a double form as illustrated in Figs. 3 and 4. In these figures 1—1 are front frames and 12 is a central frame which corresponds with the frame 2 in Figs. 1 and 2. This frame 12 will preferably be provided with fixed division plates 13. The plates 3, 4 and 5 will be hinged or centered in the frame 12 in addition to being hinged to the frames 1, and the two sets of bottom plates 7 will be hinged on the frame 12. In this double form the top bars 8 may proceed from one frame to the other in one piece as shown in Figs. 3 and 4. They will preferably pass through eyelets 16 on the top member of the frame 12.

The end plates 3 and 4 and the division plates 5 may be hinged to the frames 1 and 2 in the manner shown in Fig. 6. One end of the bar 8 is shown passing through the perforation 9 in the top member of the frame 1 and proceeding down and through a perforation 14 in the lower member of the frame. The side of the plate 3 is bent or curved to surround the perpendicular portion of the bar 8. Eyelets 15 are provided at intervals secured to the perpendicular member of the frame 1 and loosely encircling the bar 8 steadying such bar.

In operation assuming the crate to be in the open or extended condition shown in Fig. 1 and that it is desired to collapse same, the bottom plates 7 are lifted until they lie flat against the back frame 2 the front and back frames 1 and 2 may now be moved toward one another until they occupy the relative positions shown in Fig. 2. To extend the crate the two frames are moved apart until the ends 3 and 4 and division plates 5 are at right angles to the frames 1 and 2. The plates 7 may now be dropped down and will prevent the crate collapsing as before described. The operation of the double form of crate is similar to that of the single form.

I claim:—

1. A collapsible crate comprising front and rear frames, top bars having their ends pivoted in said front and rear frames, end plates and division plates pivoted to the front and rear frames, a series of bottom plates hinged to the bottom of one of said frames, and means for covering the front and rear frames.

2. A collapsible crate comprising front and rear frames, top bars having their ends pivoted to said frames and some of the bars extending downwardly, end plates and division plates pivoted to the front and rear frames on the downwardly extending portions of the top bars, a series of bottom plates hinged to the lower member of one of the frames and means for covering the front and rear frames, substantially as described.

3. A collapsible crate comprising upright frames, top bars pivotally carried thereby, end plates and division plates pivoted to one of said frames, a series of bottom plates hinged to the bottom of one of said frames and covering means for said frames.

In testimony whereof I have signed my name to this specification in the presence of two subscribing witnesses.

THOMAS GILLICHAN COLLAS.

Witnesses:
ALICE HARKER,
FLORENCE SINCLAIR.